United States Patent [19]
Jusionis

[11] Patent Number: 5,220,144
[45] Date of Patent: Jun. 15, 1993

[54] WATER COOLED ORBITAL WELDING HEAD

[75] Inventor: Vytautas J. Jusionis, Fountain Valley, Calif.

[73] Assignee: Hobart Brothers Company, Troy, Ohio

[21] Appl. No.: 856,111

[22] Filed: Mar. 23, 1992

[51] Int. Cl.$^5$ .............................................. B23K 9/12
[52] U.S. Cl. ............................. 219/60 A; 219/137.62
[58] Field of Search .................... 219/60 A, 61, 137.62

[56] References Cited

U.S. PATENT DOCUMENTS 4,554,429 11/1985 Kazlauskas ....................... 219/60 A Primary Examiner—Clifford C. Shaw
Attorney, Agent, or Firm—Biebel & French

[57] ABSTRACT

A water cooled orbital welding apparatus permits continuous welding of pipes and tubes in a limited space by including a liquid cooled plate inside a head assembly to remove heat from the gear carrying the welding electrode around the tubes being welded. A plurality of spring loaded ball bearings maintain the rotating gear in tight contact with the cooling plate. By keeping the gear and electrode cool, thermal expansion of the internal components of the welding head is minimized. Since thermal expansion is not a major factor, noncompatible materials in terms of thermal expansion characteristics may be used in the construction of the device. A removable cassette of symmetrical design allows a cassette to be mounted on the head from either the right or from the left, thus allowing the operator to open the clamps on the cassette from either the front side or the back side of the weld head. An offset hinge on the cassette permits the cassette to be removed from the welded tubes in confined space. The cassette is provided with a colored glass window to permit viewing of the welding operation.

7 Claims, 7 Drawing Sheets

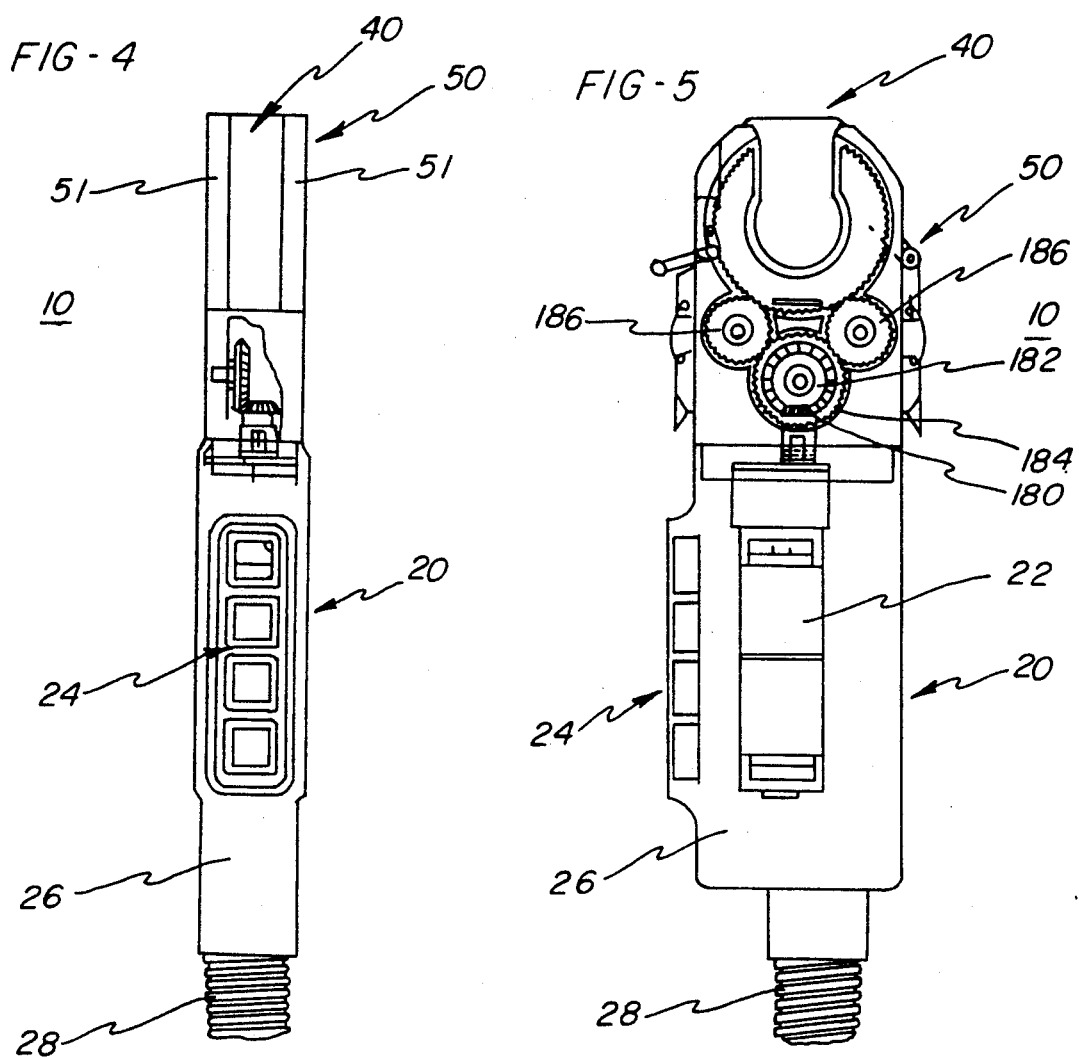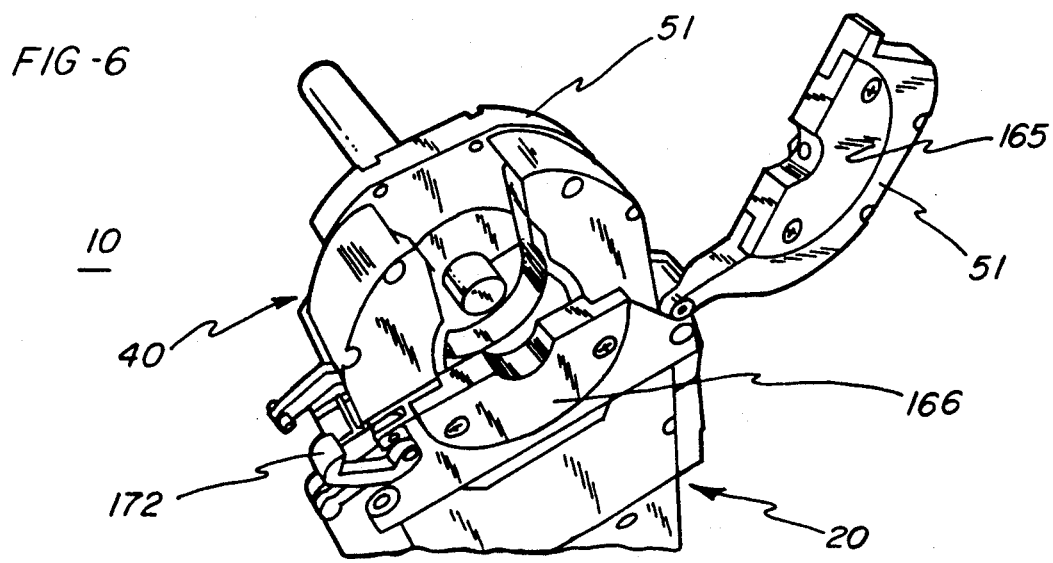

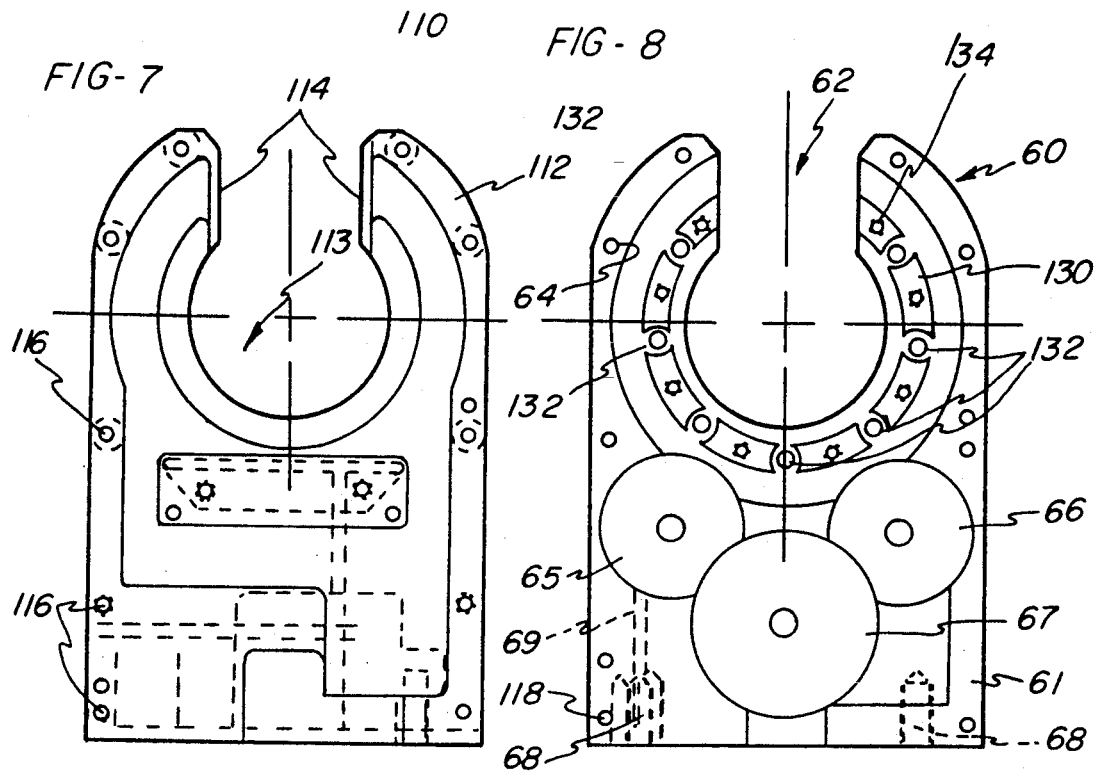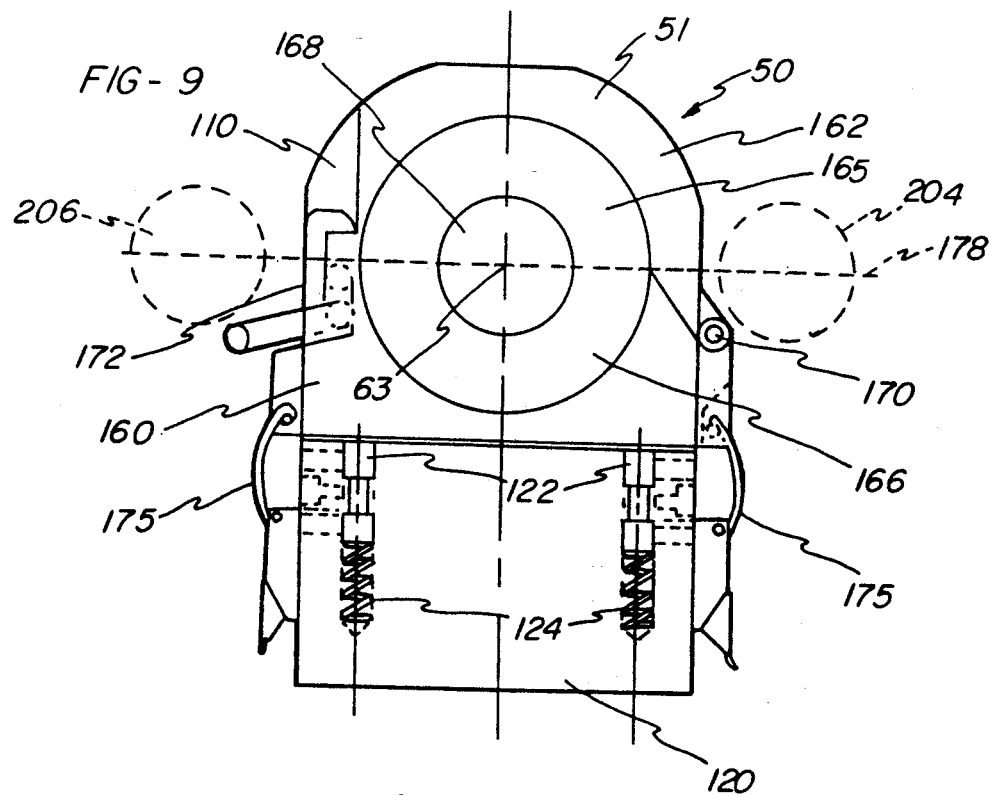

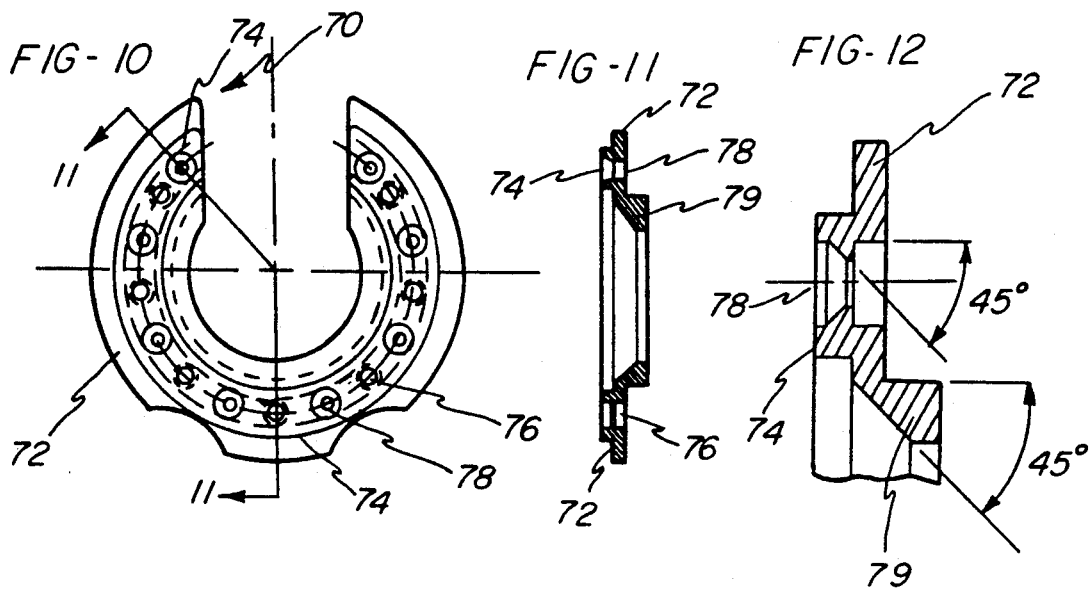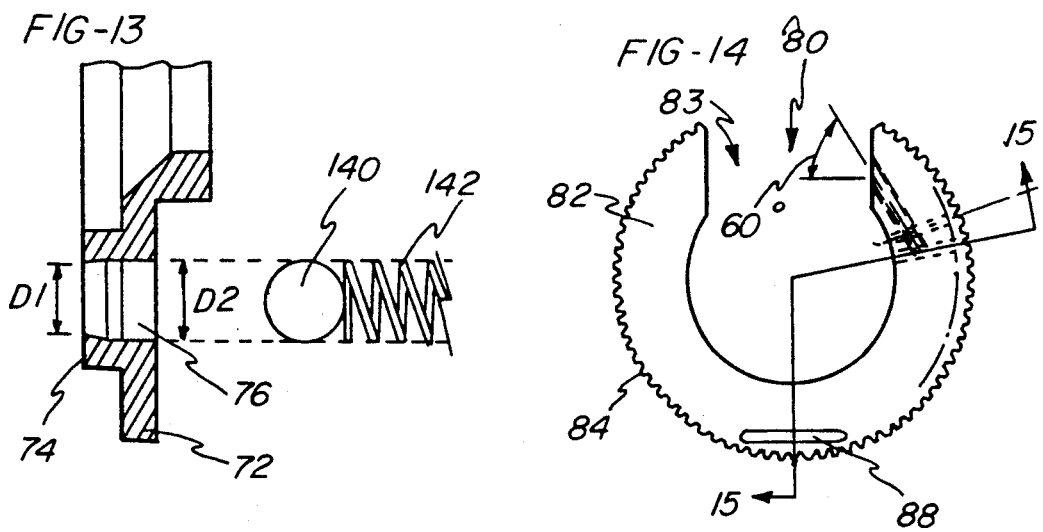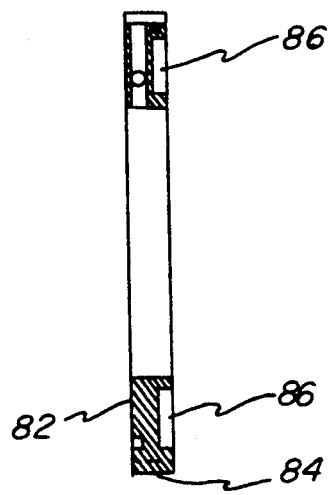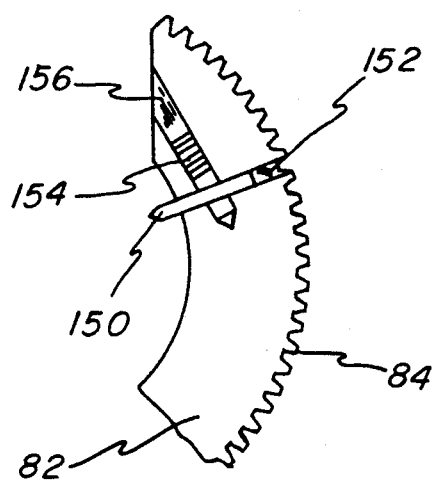

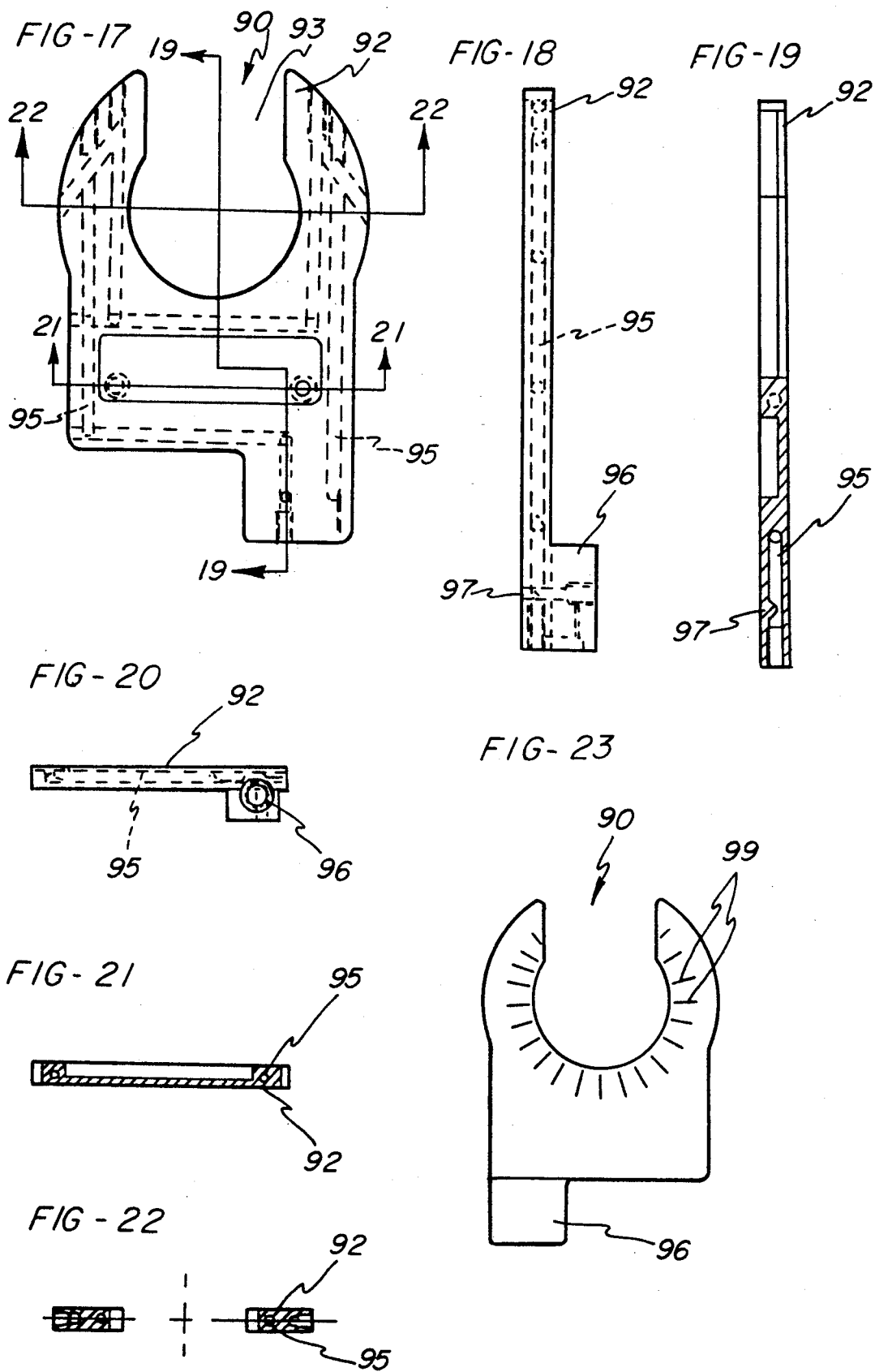

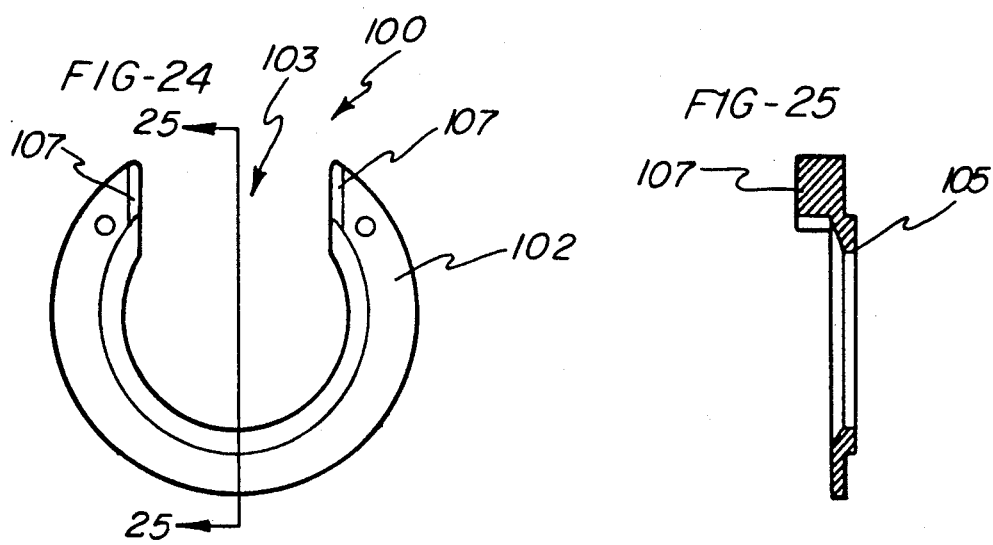

WATER COOLED ORBITAL WELDING HEAD

BACKGROUND OF THE INVENTION

This invention relates to an improvement in orbital welding heads.

There are a variety of orbital welding heads on the market for use in tube-to-tube welding. These prior art devices are often bulky or specialized. Some are not provided with a cassette, which allows for a full 360° viewing of the alignment between the tubes. Some devices are equipped with a cassette that is non-symmetrical, that is, the cassette can only fit onto the welding head in one direction. Most of these cassettes have protuberances, such as the latch which holds the cassette to the head or which closes the cassette around the tubes, that preclude the welding device from being used in tight spaces.

Some prior art devices are provided with water cooling to the power lines but not to the welding head itself. In one such device, the water lines are run down the same lines as the power cables and therefore cool the power cables, thus permitting the use of more smaller and more flexible cables, but in that device, the head itself is not cooled.

In some other devices, a water jacket is associated with the head. Such devices, however, are bulky, making the entire assembly extremely wide.

SUMMARY OF THE INVENTION

This invention relates to a water cooled orbital welding apparatus which permits continuous welding of pipes and tubes in a limited space.

At the heart of this invention is a cooling member placed inside an orbital welding head which functions primarily to remove heat from the gear carrying the welding electrode around the tubes being welded, and also to transfer welding current to the welding electrode. By keeping the gear and electrode cool, which is at the hottest part of the welding device, thermal expansion of the internal components of the welding head are minimized and deterioration of components due to heat is likewise minimized.

This cooling member makes it possible for the welding apparatus to have high duty cycle for rapid and continuous high current welding. Further, the size of components within the head itself may be reduced, providing a narrow profile, thus allowing the head to be used in small spaces. Also, since the internal components of the welding head remain at slightly above ambient conditions, thermal expansion is not a major factor and therefore noncompatible materials in terms of thermal expansion characteristics may be used in the construction of the device.

The welding apparatus of this invention includes a removable cassette of symmetrical design, allowing the cassette to be mounted on the head from either the right or from the left, thus allowing the operator to open the clamps on the cassette from either the front side or the back side of the weld head. The cassette is provided with a colored glass window to permit viewing of the welding operation.

It is therefore an object of this invention to provide an improved orbital welding apparatus wherein the head includes a water cooled member for removing heat from the welding electrode and the rotating gear that moves the electrode around the weld.

It is another object of this invention to provide an orbital welding apparatus wherein the rotating gear is guided by a Teflon race provided with a plurality of captive spring loaded ball bearings to maintain the gear in tight mechanical, electrical and thermal contact with the cooled member.

It is a further object of this invention to provide an orbital welding apparatus having a narrow profile, thus permitting the apparatus to be used in tight spaces.

It is another object of this invention to provide an improved orbital welding apparatus including a cassette for holding tubes to be welded, which cassette is symmetrical to allow access from either side of the welding apparatus and which includes an offset hinge to permit removal from a welded tube in a confined space.

It is still another object of this invention to provide an orbital welding head for joining two tubes positioned end-to-end, said welding head including a horseshoe gear made of an electrically conducting material and having a first coefficient of thermal expansion, a welding electrode carried by said gear for rotation about the tubes to be welded, drive means for rotating said gear through a continuous 360° orbit around a tube to be welded, a race for guiding said gear, said race being made from a material having a second coefficient of thermal expansion, a cooling member, coaxial with and in direct sliding contact with said gear, said cooling member having approximately the same horseshoe configuration as said gear and being formed from a material having a third coefficient of thermal expansion, means for supplying electrical current to said cooling member, and through the cooling member to said gear, means for supplying cooling liquid to said cooling member also to cool said gear and said race to minimize thermal expansion due to heating during welding of the tube.

It is still another object of this invention to provide an orbital welding head for joining two tubes positioned end-to-end, said welding head including a housing, a semi-circular gear made of an electrically conducting material mounted in said housing, a welding electrode carried by said gear for rotation about the tubes to be welded, drive means for rotating said gear through a continuous 360° orbit around the tubes to be welded, a race mounted in said housing for guiding said gear in a circular orbit, a cooling member, coaxial with and in direct sliding contact with said gear, said cooling member having approximately the same semi-circular configuration as said gear, means for supplying electrical current to said cooling member, and through the cooling member to said gear, means for supplying cooling liquid to said cooling member to cool said gear.

It is still another object of this invention to provide an orbital welding head assembly including a housing, a semi-circular gear made of an electrically conductive material, said gear having a circular recess formed therein, a welding electrode carried by said gear for rotation about the tubes to be welded, a race mounted in said housing having a circular track formed thereon for mating with said recess formed in said gear to insure said gear rotates in a circular orbit, a cooling plate provided with liquid cooling passages therein, means for supplying cooling liquid to said cooling plate to remove heat from said gear, a plurality of spaced apart ball bearings mounted within said race in contact with said gear, and a plurality of springs placed between said ball bearings and said housing to urge said gear into intimate contact with said cooling plate.

Other objects and advantages of the invention will be apparent from the following description, the accompanying drawings and the appended claims.

BRIEF DESCRIPTION OF THE DRAWINGS

FIG. 4 is a side elevational view of the complete orbital welding apparatus of this invention;

FIG. 5 is a front elevational view of the complete orbital welding apparatus of this invention;

FIG. 6 is a perspective view showing one section of a tube clamp in the open position, ready to receive a tube section to be welded, and another section of the tube clamp closed with a tube section properly installed;

FIG. 7 is a front elevational view of a front cover plate for the head assembly;

FIG. 8 is a front elevational view of the body housing member;

FIG. 9 is a front elevational view showing the ground plate and a cassette including tube clamp in the closed position;

FIG. 10 is a front elevational view of a gear race or bearing for maintaining proper alignment of a horseshoe gear;

FIG. 11 is a cross sectional view taken along lines 11—11 of FIG. 10;

FIG. 12 is an enlarged cross sectional view of the upper portion of the race shown in FIG. 11;

FIG. 13 is an enlarged cross sectional view of the lower portion of the race shown in FIG. 11, and also showing a ball bearing and spring associated with an opening in the race;

FIG. 14 is a front elevational view of a horseshoe gear which carries a tungsten electrode and which rotates around the joint between the two tube sections to be joined;

FIG. 15 is a cross sectional view taken along lines 15—15 in FIG. 14;

FIG. 16 is an enlarged cross sectional view of a portion of the horseshoe gear of FIG. 14 showing a tungsten electrode installed;

FIG. 17 is a front elevational view of a cooling member;

FIG. 18 is a side elevational view of the cooling member of FIG. 17;

FIG. 19 is a cross sectional view taken along lines 19—19 in FIG. 17;

FIG. 20 is a bottom plan view of the cooling member of FIG. 17;

FIG. 21 is a cross sectional view taken along lines 21—21 of FIG. 17;

FIG. 22 is a cross sectional view taken along lines 22—22 of FIG. 17;

FIG. 23 is a rear elevational view of the cooling member of FIG. 17;

FIG. 24 is a front elevational view of a protector ring; and

FIG. 25 is a cross sectional view of the protector ring taken along lines 25—25 of FIG. 24.

DESCRIPTION OF THE PREFERRED EMBODIMENT

Figure 1:
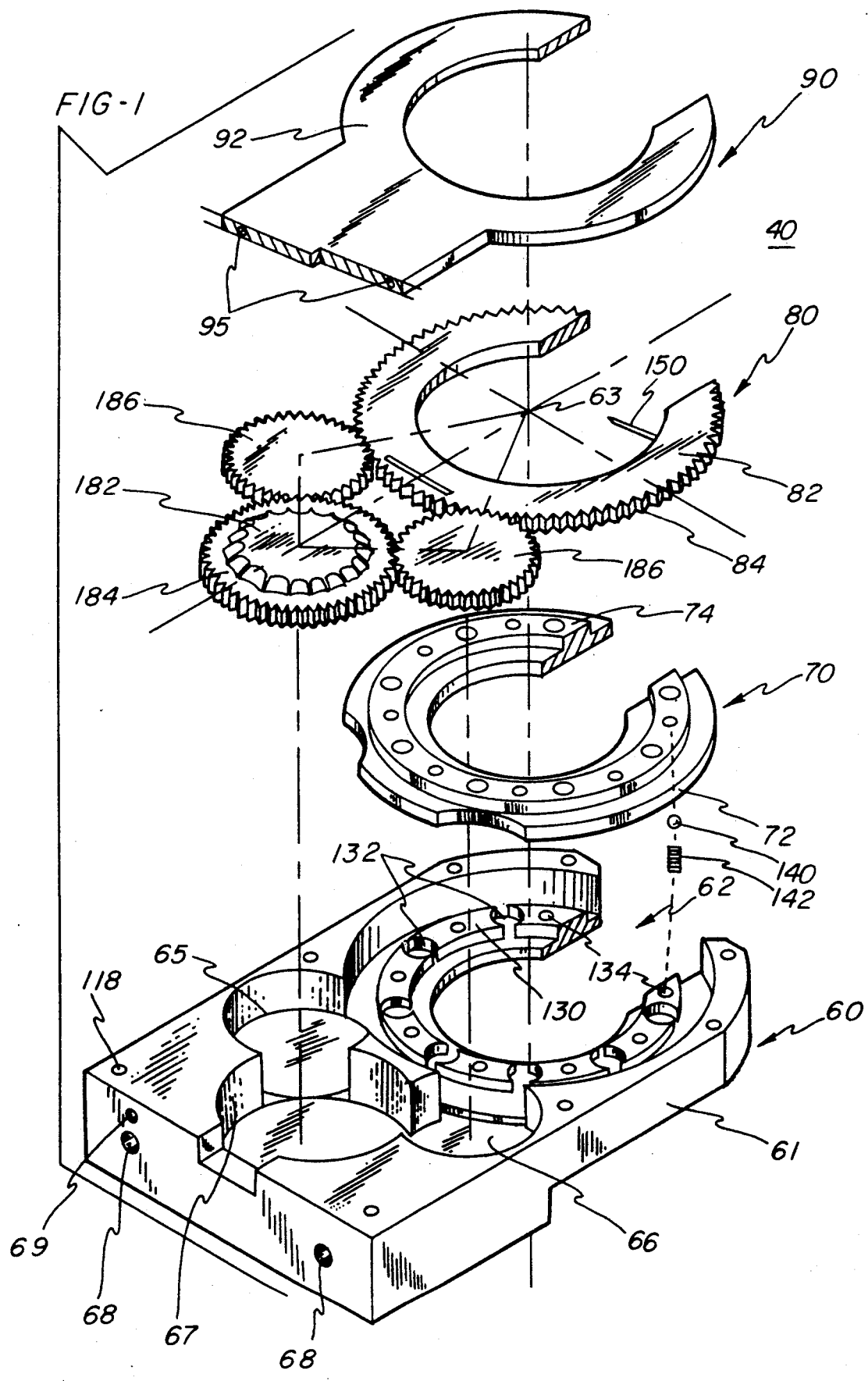
FIG. 1 is an exploded perspective view of some of the operating elements in the head portion of an orbital welding apparatus constructed according to this invention.

Referring now to the drawings which illustrate a preferred embodiment of this invention, a complete orbital welding apparatus is shown generally at 10 in FIGS. 4–6. A handle 20 includes a motor 22 and a set of push button controls 24 within a housing 26. A cable 28 provides electrical power cables, cooling lines, shielding gas lines and remote control cables to the welding apparatus 10.

A head assembly 40 is located atop the handle 20 and includes the mechanism for rotating an electrode rotated about the tubes to be welded in an enclosed, gas shielded environment.

A removable cassette assembly 50 is installed on the head assembly to provide support for the tubes to be welded. As shown in FIG. 6, the cassette includes a pair of clamps 51 placed on either side of the upper portion of the head assembly. The clamps house removable collets to accommodate various sizes of tubes to be welded. One of the clamps 51 includes a window 55 of colored glass to permit viewing of the welding operation.

Figure 2:
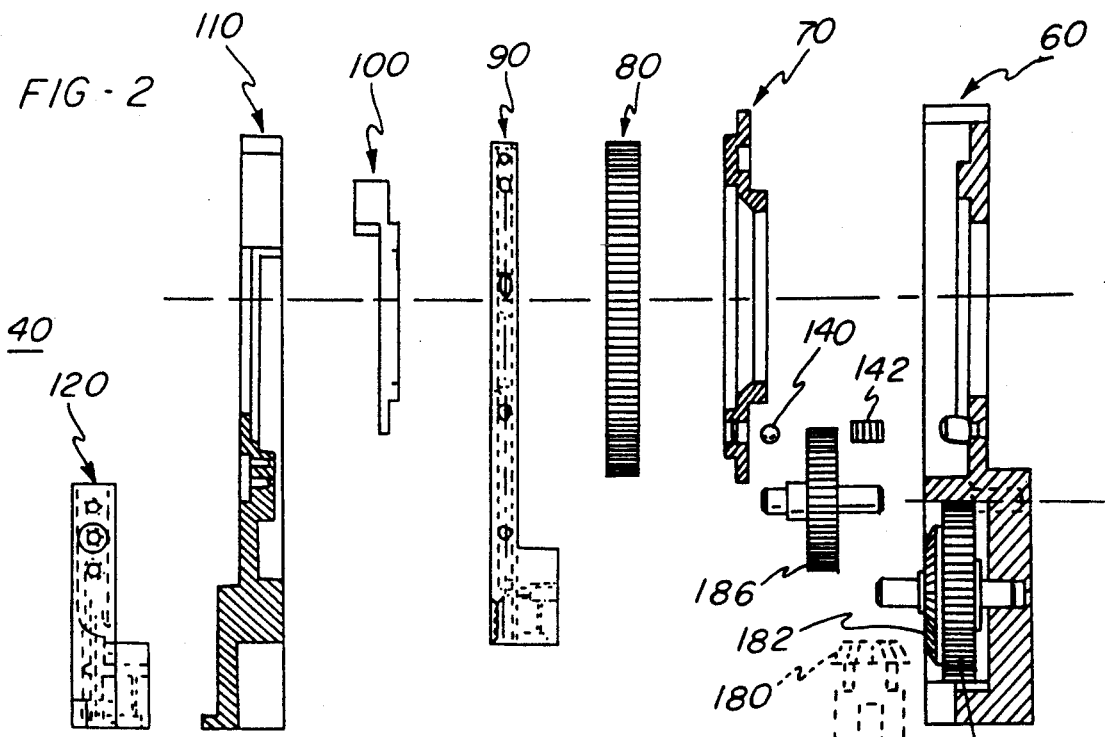
FIG. 2 is an exploded elevational view showing some of the operational elements of the welding head.

Referring now to FIGS. 1 and 2, the head assembly 40 includes several components including a body housing 60, a bearing race 70, a horseshoe shaped gear 80, a cooling plate 90, a protection ring 100, a cover plate 110, and a ground plate 120.

The body housing 60 is a mechanically formed member 61 provided with four openings, as illustrated in FIGS. 1 and 8. A large opening 62 extends entirely through the member 61 and is horseshoe in configuration in order to permit the tubes to be welded to be inserted thereinto and aligned coaxially with a center of rotation 63. Surrounding the opening 62 is a large opening 64 to accommodate the ring gear 80. Openings 65, 66 and 67 are circular and are of such size to receive the gears that rotate the gear 80. Openings 68 are threaded to receive bolts from a motor mounting member in the lower part of the housing, as will be explained. A small opening 69 extends from the bottom of the housing into the opening 65 for the continuous flow of shielding gas into the head assembly.

Formed within the large opening 64 is a raised semicircular member 130 into which has formed therein a plurality of openings 132. Also provided are a plurality of tapped holes 134.

A bearing race 70 is installed into the body housing 60. The race 70 shown in FIGS. 1-2 and 10-13, includes a horseshoe shaped ring 72, preferably made of Teflon or other material having similar heat resistant and low friction characteristics. A circular track 74 is formed on one side for guiding the gear 80. Two types of openings are formed in the track 74. The first openings 76, shown in FIG. 13, are associated with the openings 132 in the body housing 60. These openings have a diameter D1 on the side of the track facing the gear 80, which is less than the diameter of a ball bearing 140. The construction insures the ball bearings are retained within the race. Of course, the interior diameter D2 of the opening 76 is large enough to accommodate the ball bearing. The ball bearings act to push the gear into positive mechanical, electrical and thermal contact with the cooling plate 90 throughout the entire area of contact.

The other type of opening 78 is shown in FIG. 12, and is merely a counter sunk hole which receives a mounting screw to secure the race to the body housing when inserted into the tapped holes 134.

Prior to installation of the race 70 onto the body housing 60, springs 142 are placed in the openings 132 of the body housing, the ball bearings 140 are positioned within the openings 76, and the race 70 is then securely attached to the housing. A flange 79 extends into the opening 62 of the body member to provide some protection thereto.

The ring gear 80 is shown in FIGS. 14-16 and includes a semi-circular ring 82 having an opening 83, and gear teeth 84 on its outer periphery. As shown in FIG. 15, a circular recess 86 extends completely around the gear, and this recess is designed to be placed over the track 74 of the bearing race 70 to ensure the gear rotates about the center of rotation 63. A slot 88 is formed in the gear, as shown in FIG. 14 for the purpose of mounting a permanent magnet which, in combination with a reed switch (not shown) provides gear position information.

As shown in the enlarged cross sectional view of FIG. 16, an electrode 150 is attached to the gear by inserting the electrode into a radial opening 152, and by securing the electrode in place by means of a screw 154 which is installed in a tapped opening 156. The electrode 150 therefore rotates with the gear and may be adjusted radially to accommodate tubes of various sizes to be welded.

The gear 80 may be made of any electrically conductive material, such as brass or stainless steel. If made of brass, it is preferably plated with nickel, chromium or some other hard metal.

A cooling plate 90 is shown in FIGS. 1-2 and 17-23. This plate provides both electrical contact with the tungsten electrode 150 through the gear 80 as well as cooling of the entire welding head assembly. As shown, the cooling plate is formed from a thin plate of brass or other similar material 92 which is provided with an opening 93 having the same size and configuration as the openings in the other components of this apparatus to permit the welded tubes to be removed. Since this plate provides cooling for the entire apparatus, it has formed therein a plurality of openings 95 which allow water or other cooling liquids to flow in a serpentine path around the opening 93. The cooling liquid is injected into a manifold 96 and into openings 95 in the plate, and the heated liquid is removed from the plate at exit port 97, where it enters the cover plate 110, transverses across the cover plate and enters the ground plate 120.

While not shown, water hoses connected to both the cooling plate 90 at manifold 96 and a hose connected to the ground plate 120 also contain electrical cables. These cables may be of small diameter because of water cooling and do not interfere with the free flow of cooling liquid to the apparatus.

A plurality of radial notches or grooves 99 are formed on the plate 90, as shown in FIG. 23, on the side of the plate in contact with the gear 80. These notches assure that any dirt, dust, or other contaminants do not interfere with the electrical contact between the gear 80 and the plate 90. In a preferred embodiment, the grooves are 0.4 mm deep and are spaced at intervals of 15°.

A protector ring 100, shown in FIGS. 2 and 24-25, is formed of a heat resistant material 102, such as Teflon, and is provided with a central opening 103 of the same general configuration as the opening in cooling member 90. The protector ring includes a flange 105 which extends into the opening 93 of the cooling member 90, and a pair of outwardly extending tabs 107 which are designed to protect the opening in the cover plate 110.

The cover plate 110 is shown in FIGS. 2 and 7, and is preferably machined of the same material 112 as the body housing 60. The cover plate 110 also is provided with an opening 113 of the same configuration as the other openings. The tabs 107 of the protection ring 100 cover the interior portions 114. The cover plate is provided with several openings 116 through which bolts pass into threaded openings 118 in the body housing 60.

A ground plate 120, shown in FIGS. 2 and 9, is attached to the front of the cover plate 110. The ground plate includes a pair of plungers 122 that are urged upwardly by springs 124. The ground plate 120 is connected to the ground connector in cable 28 and it in turn provides the ground connection to the cassette assembly 50 which is in direct contact with the tubes to be welded.

When the head assembly 40 is assembled, the springs 142 will urge the ball bearings 140 in the race 70 against the gear 80, to urge the gear into a positive electrical and thermal contact with the cooling plate 90 regardless of any spacing or play between these components that might otherwise exist.

Referring to FIGS. 6 and 9, the cassette assembly 50 includes a pair of clamps 51 containing collets for holding the tubes to be welded in their proper place during the welding operation. Each clamp 51 includes a lower or base member 160 and an upper hinged member 162. One of the hinged members is shown in the open position in FIG. 6. Collets 165 and 166 are mounted in the clamp 51, with the opening 168 having the same diameter as the tubes to be welded.

The hinged member 162 is hinged at 170 to the lower member and a locking device 172 secures these two components of the clamp together. The cassette assembly 50 is attached to the head assembly by means of spring loaded clips 175. Since the internal openings of the cassette assembly are symmetrical, it may be installed on the head assembly with the hinge 170 either to the right (as shown) or to the left of the head assembly. The hinge 170 is placed below center line 178.

Referring now to FIGS. 1, 2 and 5, the gear ring 80 is caused to rotate by the motor 22 through a gear train that includes a bevel gear 180, a matching bevel gear 182 which is attached to a central gear 184, and a pair of gears 186 that are spaced apart a distance greater than the opening 83 such that at least one gear 186 will be in contact with the ring gear 80 at all times.

Figure 3:
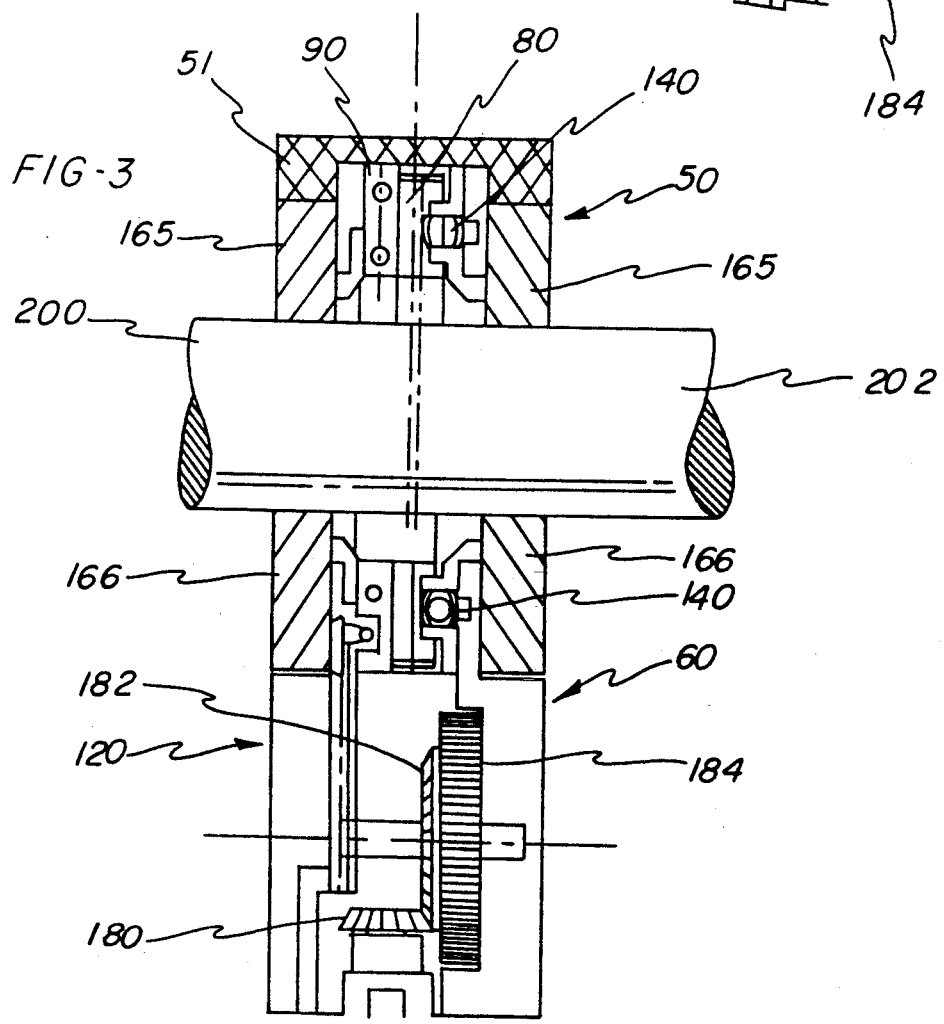
FIG. 3 is an elevational view, partly in cross section, of the welding head showing two abutting sections of tube in position to be welded.

Referring again to FIG. 3 and 9, tubes 200 and 202 are placed in the clamp 51 and held in place by suitably sized collets 165 and 166. The cassette 50 is removable from the head assembly 40, and the offset placement of the hinge 170 facilitates the removal of the cassette from the tubes even when there are adjacent tubes 204 and 206 on either side of the head assembly.

The gear 80, which carries the welding electrode, is held in tight contact with the cooled plate 90 by the action of the plurality of the spring loaded ball bearings 140. The gear is rotated by the motor driven bevel gear 180 through intermediate gears 182, 184 and 186. Since heat is removed from the head assembly, and particularly the gear 80 and the electrode 150, the thermal coefficients of expansion of the various components within the head assembly 40, specifically the race 70, the gear 80 and the cooling plate 90, do not have to be identical since the temperature rise within the head assembly during the welding operation is minimized. This is true even though the Teflon ring 70 has a thermal coefficient of expansion a factor of 10 greater than the gear. Also, these components may be made smaller than in conventional orbital welding heads because of this cooling arrangement, thus permitting a smaller and narrower head assembly to be constructed.

While the form of apparatus herein described constitutes a preferred embodiment of this invention, it is to be understood that the invention is not limited to this precise form of apparatus and that changes may be made therein without departing from the scope of the invention, which is defined in the appended claims.

What is claimed is:

1. An orbital welding head for joining two tubes positioned end-to-end, said welding head including
   a horseshoe gear made of an electrically conducting material and having a first coefficient of thermal expansion,
   a welding electrode carried by said gear for rotation about the tubes to be welded,
   drive means for rotating said gear through a continuous 360° orbit around a tube to be welded,
   a horseshoe race coaxial with said horseshoe gear for guiding said gear for rotation around a tube, said race being made from a material having a second coefficient of thermal expansion and having a low coefficient of friction,
   a cooling member, coaxial with and in direct sliding contact with said gear, said cooling member having approximately the same horseshoe configuration as said gear and being formed from a material having a third coefficient of thermal expansion,
   means for urging said gear into direct sliding contact with said cooling member to provide a positive electrical and thermal contact,
   means for supplying electrical current to said cooling member, and through the cooling member to said gear,
   means for supplying cooling liquid to said cooling member also to cool said gear and said race to minimize thermal expansion due to heating during welding of the tube.

2. The orbital welding head of claim 1 wherein said first and said third coefficients of thermal expansion are approximately equal.

3. The orbital welding head of claim 1 wherein said race has approximately the same horseshoe configuration as said gear, is coaxial with said gear, and includes a circular shaped track, and wherein said gear is provided with a circular shaped recess for mating with said track to guide said gear in a circular path about the tubes being welded.

4. An orbital welding head for joining two tubes positioned end-to-end, said welding head including
   a housing,
   a semi-circular gear made of an electrically conducting material mounted in said housing,
   a welding electrode carried by said gear for rotation about the tubes to be welded,
   drive means for rotating said gear through a continuous 360° orbit around the tubes to be welded,
   a semi-circular race having the same general configuration as said gear mounted coaxial with said gear in said housing for guiding said gear in a circular orbit,
   a cooling member, coaxial with and in direct sliding contact with said gear, said cooling member having approximately the same semi-circular configuration as said gear,
   biasing means for urging said gear into positive electrical and thermal contact with said cooling member,
   means for supplying electrical current to said cooling member, and through the cooling member to said gear, and
   means for supplying cooling liquid to said cooling member to cool said gear.

5. An orbital welding head assembly including
   a housing,
   a semi-circular gear made of an electrically conductive material, said gear having a circular recess formed therein,
   a welding electrode carried by said gear for rotation about the tubes to be welded,
   a race mounted in said housing having a circular track formed thereon for mating with said recess formed in said gear to insure said gear rotates in a circular orbit,
   a cooling plate provided with liquid cooling passages therein,
   means for supplying cooling liquid to said cooling plate to remove heat from said gear,
   a plurality of spaced apart ball bearings mounted within said race in contact with said gear, and
   a plurality of springs placed between said ball bearings and said housing to urge said gear into intimate contact with said cooling plate.

6. The apparatus of claim 5 wherein said race is provided with a plurality of openings in said track, said openings having a diameter adjacent the gear that is slightly smaller that the diameter of said ball bearings thereby to retain said ball bearings captive within the race.

7. The apparatus of claim 6 wherein said housing is provided with a raised semi-circular member having a plurality of spaced apart openings aligned with said ball bearing retaining openings in said track for receiving said springs.

* * * * *